United States Patent [19]

Carpenter

[11] 4,121,695
[45] Oct. 24, 1978

[54] HYDRAULIC WHEELCHAIR LIFT

[75] Inventor: Robert M. Carpenter, Indian Harbor Beach, Fla.

[73] Assignee: Target Industries, Inc., West Springfield, Mass.

[21] Appl. No.: 781,032

[22] Filed: Mar. 24, 1977

[51] Int. Cl.² ............................................ B60P 1/44
[52] U.S. Cl. .................................. 187/9 R; 214/75 R
[58] Field of Search ............... 187/1 R, 9 R, 9 E, 10, 187/17, 26; 214/75 R, 75 T, 77 R, 77 P

[56] References Cited

U.S. PATENT DOCUMENTS

| 3,651,965 | 3/1972 | Simonelli et al. | 214/75 R |
| 3,800,915 | 4/1974 | Himes | 187/1 R |
| 4,015,725 | 4/1977 | Ryan et al. | 214/75 R |
| 4,056,203 | 11/1977 | Meldahl et al. | 214/75 R X |

*Primary Examiner*—Evon C. Blunk
*Assistant Examiner*—James L. Rowland
*Attorney, Agent, or Firm*—Chapin, Neal & Dempsey

[57] ABSTRACT

Wheelchair lift for a van-type vehicle having a pivotable frame which may be swung from within to without the vehicle, a slide frame telescopically movable relative to the swing frame and a wheelchair supporting platform carried at the lower end of the slide frame. The platform is pivotable to and from a horizontal position in an upright folded position, generally coplanar with the swing frame so that the entire assembly is disposed within the vehicle. A hydraulic ram having a power stroke in one direction and a return stroke in the opposite direction provides means for taking up cables disposed on opposite sides of the swing frame and is operatively connected to both the side frame and the platform. The power stroke of the ram causes the slide and the platform carried thereby to be raised from the ground level to the floor level of the vehicle for transfer of a wheelchair to and from the platform of the vehicle. The power stroke of said ram also causes the pivotal movement of the platform to its folded position after the weight of the wheelchair has been removed from the platform. Mechanisms are provided which, upon the movement of the platform to its folded position, cause mechanical energy to be stored which is used to initiate subsequent unfolding movement of the platform and swing frame. The pivotable movement of the platform and the downward movement of the slide is caused by gravity and the rate thereof is controlled by release of hydraulic pressure from the high pressure end of the ram.

10 Claims, 7 Drawing Figures

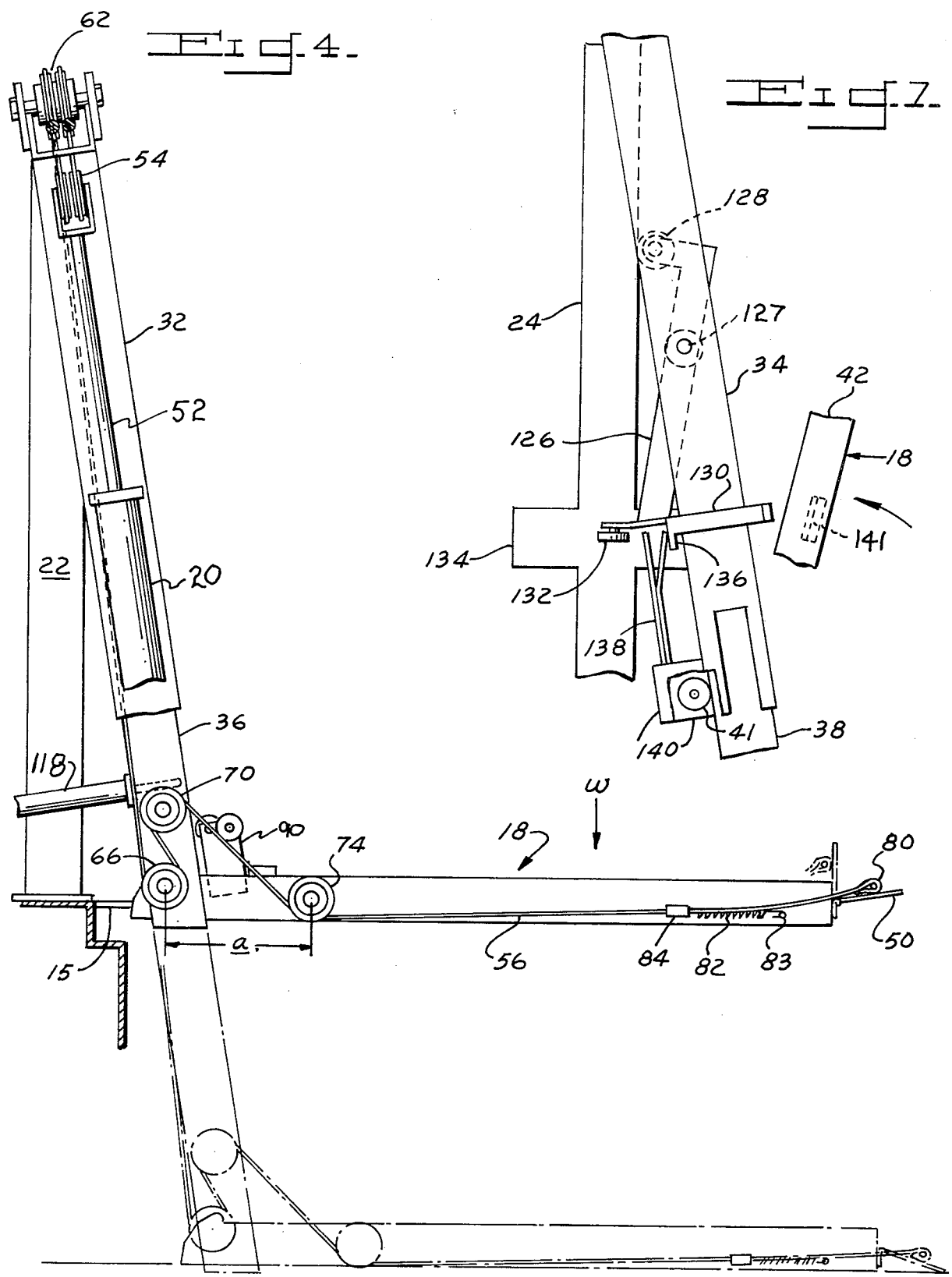

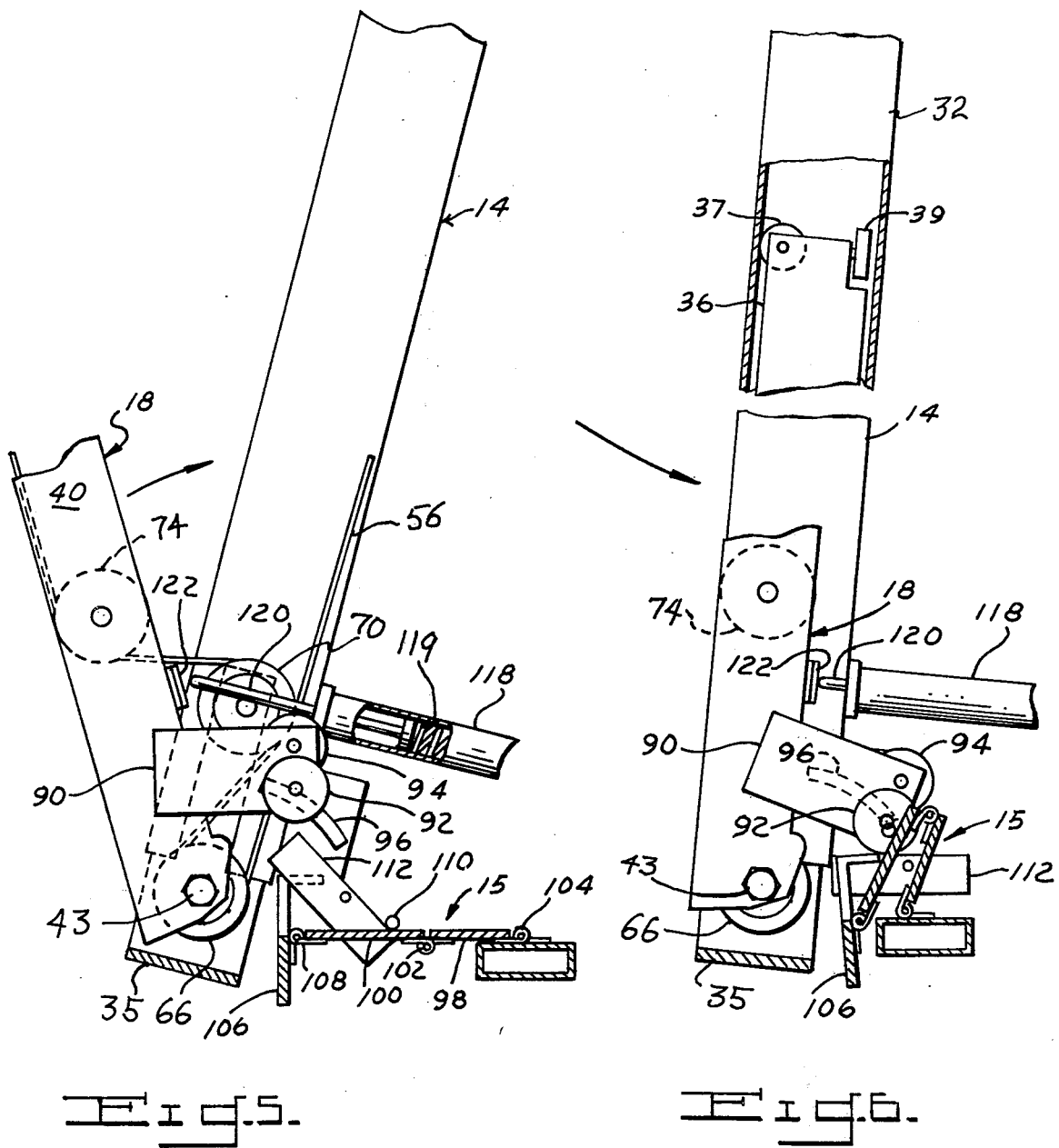

HYDRAULIC WHEELCHAIR LIFT

BACKGROUND OF THE INVENTION

In recent years many advances have been made by which handicapped persons, particularly those confined to wheelchairs, have enjoyed greater freedom of movement and mobility.

In the past, it has always been difficult to transport handicapped persons confined to wheelchairs from place-to-place within the community using conventional vehicles. On occasion, various civic and charitable groups have purchased and equipped special van-type vehicles to carry wheelchairs. The equipment installed in such vehicles includes various ramps and lift mechanisms by which occupied wheelchairs can be transferred to and from the ground level to the floor level of the van.

Many of the various types of wheelchair lifts which have been developed and are installed in such van-type vehicles are relatively cumbersome and complex in construction and their installation and maintenance are usually costly and time consuming. Many of the wheelchair lifts currently available are not entirely reliable and in cases of a power or hydraulic failure when the lift is in actual operation passenger safety has been a matter of serious concern. The paramount criterion of any wheelchair lift is safety and that in any emergency or power failure, the handicapped person will be safely lowered to the ground. Another requirement is that the construction of the lift facilitates its installation and that the components are simple in construction and reliable in operation whereby lift maintenance is economical.

The principal object of this invention is to provide a wheelchair lift for installation in van-type vehicles which is simple in construction, highly reliable in operation and which can be readily installed in various conventional vans without vehicle modification.

Another object of this invention is to provide a wheelchair lift of the above type which is capable of safely lowering an occupied wheelchair from a vehicle floor level to the ground, even in the case of a power or hydraulic failure.

A further object of this invention is to provide a wheelchair lift of the above type in which a single hydraulic cylinder serves to lower, raise and completely fold the lift within the doorway opening of a van-type vehicle and in which the lowering of a wheelchair on the lift can be safely carried out even in the case of a power or hydraulic failure, such as the rupture of a fluid line.

Yet another object of this invention is the provision of mechanism means to initiate the unfolding and pivoting of the lift platform without power assistance. In this connection, potential energy is stored during the folding of the lift platform wherein some of the kinetic energy required for raising and folding the lift is subsequently utilized for this purpose.

Still a further object of this invention is the provision of mechanical means for raising, lowering, folding and also operating a safety ramp on the platform which includes a continuous length of cable on each side of the lift wherein a safety ramp is automatically pivoted by the cables to its closed position before the platform can be raised and then folded by the same cables.

The above and other objects and advantages of the present invention will become apparent from the following description taken in conjunction with the accompanying drawings wherein:

FIG. 4 is a side elevational view of the lift in the different operative positions;

FIG. 5 is a section on an enlarged scale taken along line 5—5 of FIG. 2; and

FIGS. 6 and 7 are partial elevational views showing components of the lift in various operative relationships.

Figure 1:
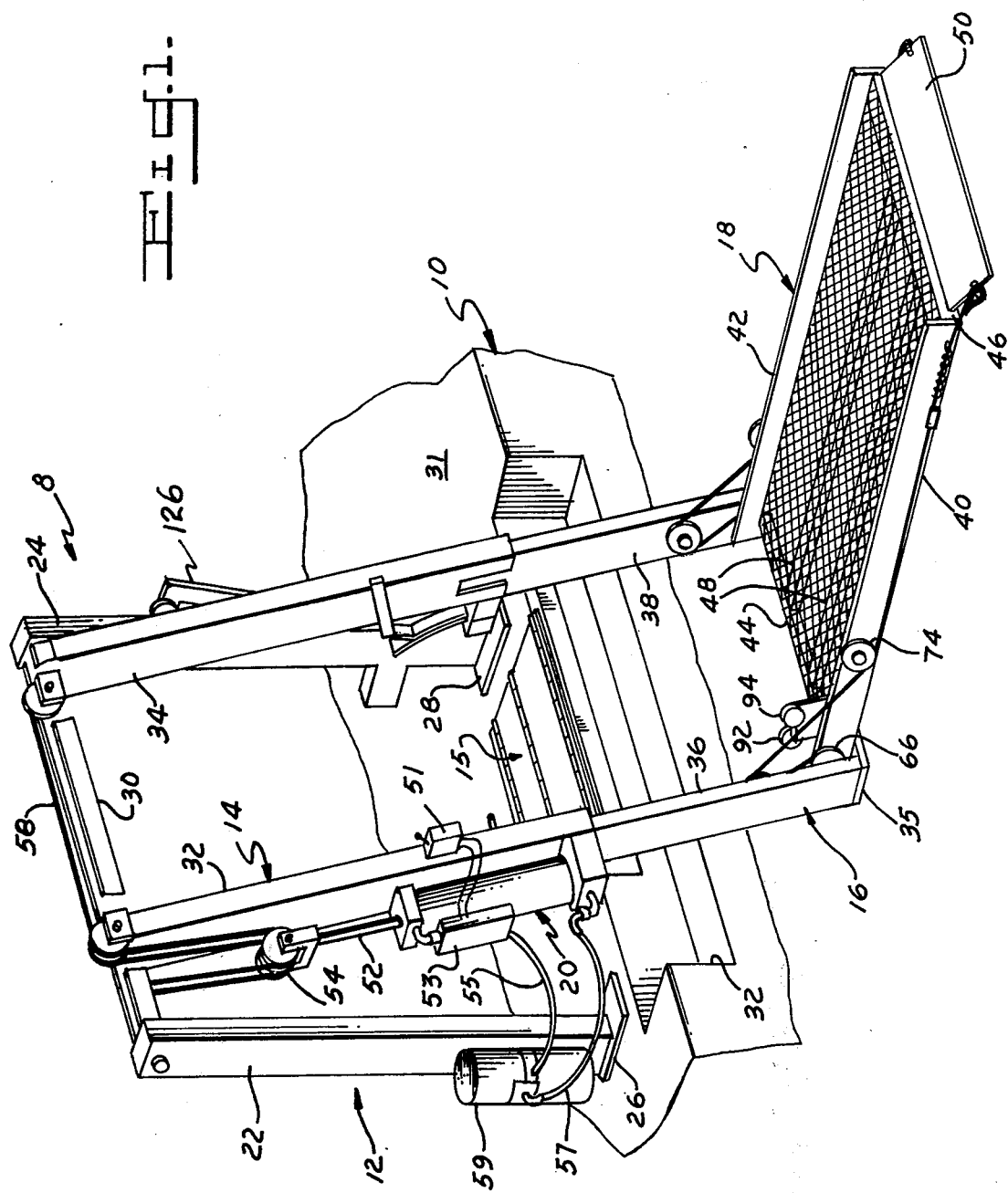
FIG. 1 is an overall perspective view showing a van mounted wheelchair lift of the type embodying this invention.

Referring in detail to the drawings, in FIG. 1 is shown a hydraulic wheelchair lift 18 mounted within the side door opening of a van-type vehicle 10. In general the lift comprises a fixed frame 12 mounted within the cargo opening of the van. A swing frame 14 is pivotably supported by the upper end of the fixed frame 12 whereby the frame may be swung from a retracted position within the van to an operative position extending outwardly of the van at an oblique angle, as shown in FIG. 1. A foldable bridge plate 15 is disposed within the van for spanning the gap between the floor of the van and the lift platform.

Figure 2:
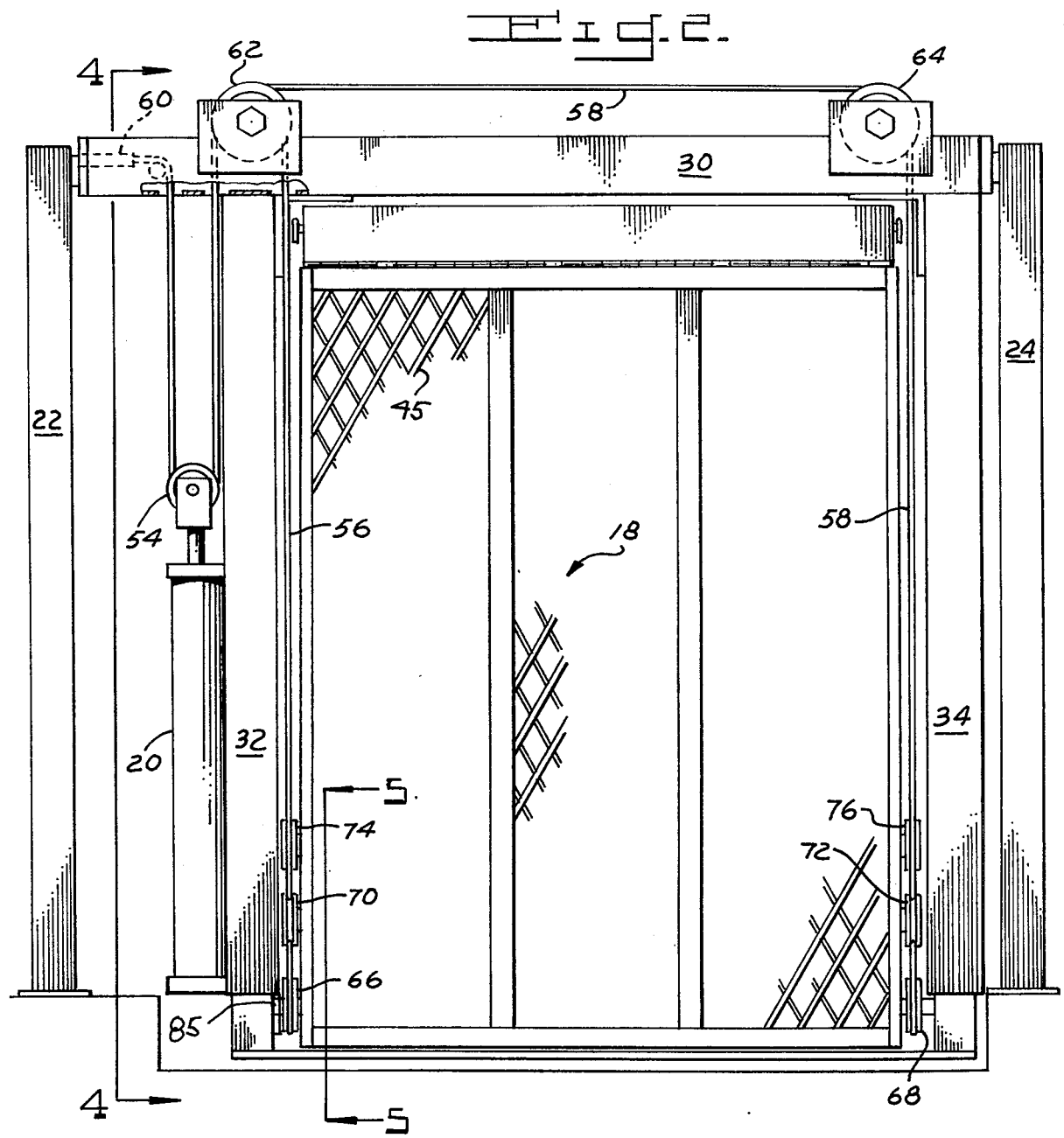
FIG. 2 is an elevational view showing the lift in its inoperative or folded position.
Figure 3:
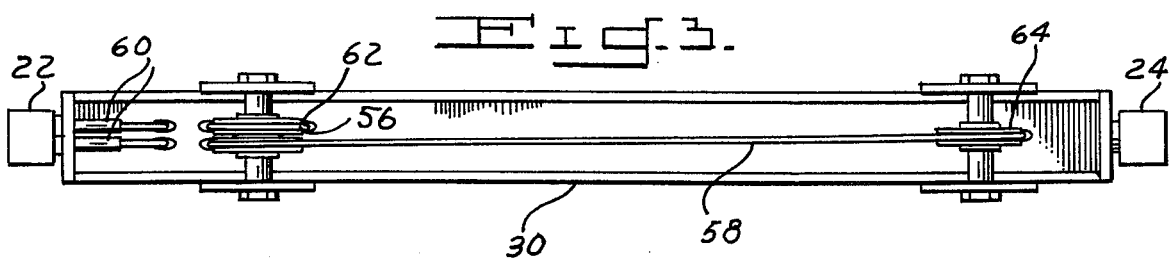
FIG. 3 is a top plan view of the lift in its FIG. 2 position.

The wheelchair lift further includes a slide frame shown at 16 which is supported by the fixed frame for vertical movement relative thereto. The wheelchair platform 18 is pivotally supported by and carried adjacent the lower end of the slide frame 16. The platform 18 may be swung to and from a generally horizontal wheelchair supporting position, as shown in FIG. 1, to an upright or folded position wherein the platform is generally coplanar within the swing frame 14 and the slide frame 16, as shown in FIG. 2. A single hydraulic cylinder or ram, shown generally at 20, operates the lift for both up and down movement of the slide frame and platform, as will hereinafter be described.

The fixed frame 12 includes a pair of parallel, upright beams or posts 22 and 24 disposed on opposite sides of the van door opening. The beams extend vertically upward from flanges 26 and 28 affixed to the lower end of the beams which are bolted to the floor of the van, represented at 30.

The swing frame 14 includes a channel shaped cross beam 30 pivotably supported adjacent the upper ends of the beams 22 and 24 and a pair of tubular parallel legs 32 and 34 of rectangular cross section affixed to the beam 30 so as to form an inverted generally U-shaped frame vertically pivotable on the fixed frame 22. The beams 22 and 24 extend to a height sufficient to enable an occupied wheelchair to be moved through the swing frame 14 into the van. In the embodiment shown, the hydraulic cylinder 20 is mounted on the outer lower surface of leg 32 of the swing frame and the stroke of its piston rod is parallel to the leg 32.

The slide frame 16 is generally a U-shaped frame including a lower cross bar 35 and upwardly extending tubular slide members 36 and 38 of rectangular cross section which are telescopically movable within the tubular legs 32 and 34 of the swing frame. The slide member beams 36 and 38 are of sufficient length to reach the ground when the slide frame is lowered to the off loading position shown in FIG. 1. The upper ends of each of the slide members 36 and 38 are provided with rollers 37 (FIG. 6) to engage the inner end wall surfaces of tubular legs 32 and 34 and rollers 39 to engage the side walls thereof. At the lower ends of each leg 32 and 34, as shown in FIG. 7, a roller 41 is provided and together with rollers 37 and 39 provides roller bearing means for the vertical movement of the slide members 36 and 38 within the tubular legs of the swing frame.

The platform 18 for supporting a wheelchair is pivotably supported as at 43 at the lower end of the swing frame 16 and comprises a rectangular frame, including side rails 40 and 42 and transversely extending frame members 44 and 46 and longitudinally extending ribs 48. A wire mesh 45 is affixed to the rectangular frame so as to provide a planar supporting surface, such as for a wheelchair. A pivotable safety ramp 50 is provided at the outer end of the platform to enable a wheelchair to be smoothly rolled onto and off the platform. The ramp 50 also serves as a safety guard rail to prevent the chair rolling off the platform as it is being raised or lowered by the hydraulically operated cable system. The mechanical lifting arrangement is such that the ramp must necessarily be raised to its "up" position before the platform can be raised off the ground.

The lift embodying this invention is controlled by an hydraulic system which includes the single hydraulic cylinder 20 carried on the swing frame 14 and a suitable electrical control mechanism, such as illustrated at 51 which controls a solenoid operated control valve unit 53 and pump which together with reservoir 59 supplies pressurized hydraulic fluid to the upper end of the hydraulic cylinder or ram 20. This causes piston rod 52 to move downwardly carrying with it the pulley 54 on the upper end of the piston rod. The piston rod 52 is adjacent leg 32 of the swing frame and its stroke is parallel to this leg in a compact arrangement. Solenoid operated control valve unit 53 regulates the flow of pressurized hydraulic fluid to the upper end of the cylinder 20 by means of hose 55 to provide the power stroke of the piston rod 52. A hole 57 serves as a return conduit of low pressure hydraulic fluid to the hydraulic reservoir and pump unit 59.

The stroke of piston rod 52 is converted to the mechanical movement of the lift by means of cables 56 and 58 (FIG. 2) which are looped around the pulley 54. Each cable has one terminal end affixed by connectors 60 to the end wall of beam 30. The cables extend downwardly through openings provided in the cross beam 30 and loop under double pulley 54 and upwardly through another opening in the channel beam 30 and around another double pulley 62 supported by a bracket attached to the side walls of beam 30. The flexible cables are thus retained in the form of adjacent U-shaped loops which increase and decrease in size as the pulley 54 is raised or lowered by hydraulic ram 20. The cable 58 extends horizontally from pulley 62 across the fixed frame to another pulley 64 while cable 56 extends downwardly alongside frame 32. Cable 58 extends downwardly from cable 64 through an opening in beam 30 alongside frame 34. Cables 56 and 58 are each lead around a pulley 66 and 68 disposed adjacent the lower inner end of each of the slide beams or legs 36 and 38. These pulleys are rotatably supported on the pivotable axis 43 of the platform 18 and together with the continuous two cables 56 and 58 provide the means by which the platform 18 is raised and lowered.

A second pair of pulleys 70 and 72 carried by the slide legs 36 and 38 of the slide frame 16 are disposed above the lower pair of pulleys 66 and 68. The centers of rotation of pulleys 70 and 72 (FIG. 4) are located adjacent the outer edge of the legs 36 and 38, while the centers of rotation of the lower pulleys 66 and 68 are located more closely adjacent the opposite or inner edges of the slide members 36 and 38. Both cables 56 and 58 follow a generally "S" shaped configuration being looped under pulleys 55 and 68 and over pulleys 70 and 72, best seen in FIG. 4. From this point, both cables extend forwardly and downwardly, tracking under a third pair of pulleys 74 and 76 carried by side rails 40 and 42 of the platform 18. Pulleys 74 and 76 are located a substantial distance $a$ forwardly of the axis 43 of pivotable movement of the platform 18. This distance provides a lever arm for pivotal movement of the platform 18 relative to the swing frame 14 for folding and unfolding the platform. Each cable extends from under the pulleys 74 and 76 and its terminal end is affixed by connectors 80 to the pivotable ramp 50 adjacent its outer edges.

A ramp control spring 82 is provided to urge sufficient slack in the outer end portions of each cable so that the ramp 50 will automatically drop by gravity to its "down" or ground engaging position when the platform is lowered. Springs 82 are affixed at their outer ends by any suitable fastener such as studs 83 to the side rails of the platform. The inner ends of both springs are connected to the cables by suitable fasteners, such as sleeves 84. Coil springs 82 thus provide slack in the portion of the cable located outwardly of fasteners 84 to cause the ramp 50 to remain in its "down" position until the cables 56 and 58 are taken up by ram 20. When the cables 56 and 58 are taken up by hydraulic ram 20, lowering pulley 54, springs 82 are first tensioned and the ramp 50 is then swung by the cables to its upright or closed position in which it serves as a safety gate for a wheelchair carried on the platform. When the ramp 50 engages the ends of side rails 40 and 42, the cables 56 and 58 are tensioned and upon further takeup of the cables, platform 18 will be raised and when carrying a weight, such as a person in a wheelchair represented by $w$ in FIG. 4, the platform will remain in a horizontal position as it rises from the ground level to the height of the van floor 31. This upward movement of the platform 18 is caused by the cables 56 and 58 exerting force directly upward on pulleys 66 and 68.

Any substantial weight, which may be on the order of about 50–100 pounds acting downwardly on the platform, as represented at $w$ in FIG. 4, will be sufficient to prevent the platform being pivoted upwardly as a result of the cables exerting upward components of force on pulleys 74 and 76 supported on the side rails of the platform. When the platform is raised to the level of the van floor 31, stop member 85 (FIG. 2) carried by leg 36 of the slide frame 16 abuts the lower edges of the side beams 32 and 34 of the swing frame. The wheelchair may then be rolled into the van across bridge plate 15. Thereafter actuation of the control switch 51 to the "up" position will cause continued takeup of the cables 56 and 58 as the pulley 54 is lowered. The cables will then exert upwardly and inwardly directed forces on pulleys 74 and 76 and the platform 18 will thus pivot upwardly toward its folded position in coplanar relationship with the swing frame, as illustrated in FIGS. 2, 5 and 6. The stroke of piston rod 52 which carries pulley 54 causes takeup of both cables 56 and 58 which is double the stroke length of the piston.

The lift embodying this invention is provided with an hydraulic system in which hydraulic pressure will be vented or released if an attempt is made to fold up the platform when a substantial weight is supported by the platform. The force required to pivot the platform in such cases is proportional to a predetermined hydraulic pressure and a relief or safety valve is set to release or vent any hydraulic pressure developed in the system which is in excess of this predetermined value.

Means is provided for guiding the pivotal movement of the platform 18 and for actuating the folding movement of the bridge 15. As best seen in FIGS. 5 and 6, a bracket 90 extends upwardly from the side rail 40 adjacent the pivot axis of the platform. A pair of rollers 92 and 94 are carried on the bracket adjacent the opposite upper corners thereof. The roller 92 extends outwardly from the inner surface of the bracket and roller 94 extends outwardly from the outer surface of the bracket. An arcuate member or cam 96 is affixed to the inner surface of the leg 32 of swing frame 12 and is disposed so that its convexly curved surface faces upwardly to be engaged by the roller 94 as the platform 18 is swung through the terminal portion of its pivotal movement into alignment with swing frame 14, as shown in FIG. 5. Engagement of roller 94 on the arcuate member 96 assists in guiding the platform to its fully folded position and provides support for the combined weight of the slide assembly and platform so that the cables 56 and 58 are not tensioned to support this weight when the lift is not actually in use.

The foldable bridge 15 includes two panels 98 and 100 (FIG. 5) hingedly connected along their adjacent edges by hinge 102. The opposite outer edge of panel 98 is hinged as at 104 to the floor of the van. Bridge 15 also includes a generally upright riser portion 106 hingedly connected as at 108 to the outer edge of the bridge panel 100. An actuator pin 110 extends outwardly of the side edge of panel 100 for operation of the bridge 15. A pivotable trip plate 112 is disposed so that one end is positioned to engage the outwardly extending portion of the actuator pin 110. The other end of the plate 112 is disposed for engagement by the roller 92, as the platform 18 swings into folded position. When this occurs, the roller 92, carried by bracket 90, pivots the trip plate 112 so that its inner edge engages pin 110, causing the bridge plate 15 to fold up, as shown in FIG. 6. Simultaneously, gravity causes swing frame 14 to pivot into its FIG. 6 position. As the platform 18 and the swing frame 14 swing to their fully folded and retracted position, ejector mechanisms are charged or energized whereby the swing frame and platform may be automatically partially unfolded without hydraulic pressure and even in the event of a power or hydraulic failure.

One such ejector mechanism comprises a plunger 118 carried by a suitable bracket on the leg 32 of the swing frame which includes a coil spring 119. A plunger rod 120 extends outwardly from one end of the plunger cylinder and is disposed to engage a wear pad or shim plate 122 carried by the upper edge of side rail 40. As shown in FIGS. 5 and 6, as the platform 18 is swung to the hynested or folded position within frame 14 by the hydraulic system, the plunger rod 120 is moved into the plunger cylinder 118 compressing the coil spring 119. The coil spring of the plunger is thus charged with potential energy useful in moving the platform 18 from its folded position outwardly when the hydraulic system is actuated for lowering the lift.

On the other side of the frame, mechanical ejector means is provided for moving both the swing frame 14 and platform 18 from their fully folded condition, as shown in FIG. 6. The ejector means comprises a throwout arm or lever 126, best shown in FIG. 7, pivotably supported by the leg 34 of the swing frame on a pin 127. A roller 128 is carried on the upper end of the lever 126 to engage the outer edge of beam 24 of the fixed frame of the lift mechanism. At the lower end of the arm 126 is a transversely extending actuator arm 130. The arm 130 extends generally transversely to the direction of pivotable movement of the lever 126. At its inner end the arm 130 includes a roller 132 disposed to ride upon the inner surface of the beam 24 and a horizontal transverse extension 134 provided thereon. Movement of the roller 132 against the horizontal extension of the beam 24 serves to guide the swinging movement of the pivotal lever 126 in a vertical plane. From the roller 132 the arm 130 extends forwardly of the leading edge of swing leg 34 for engagement by the side rail 42 of the platform 18. A lug 134 depends downwardly from the inner end of arm 130 and is disposed to engage the upper end of a dual leaf spring 138 supported by a bracket 140 affixed to the lower edge of the leg 34. The platform 18 is provided with a lug or abutment plate 141 carried on side rail 43 for engagement with the outer end of arm 130. As the kinetic energy of the hydraulic ram 20 causes platform 18 to be swung into coplanar relation with the swing frame 14, the swing frame moves toward its retracted or folded position shown in FIG. 6 and the arm 130 is pivoted in a clockwise direction by engagement of the roll 128 with the edge of beam 24. This causes the leaf spring 138 to be tensioned so that the spring 138 is loaded and mechanical potential energy is stored for use in the lowering position to cause initial outward movement of the swing frame 14. At about the same time lug 141 engages the outer lug of arm 130 and further tensions spring 138.

It will thus be seen that springs 118 and 134 disposed on both sides of the platform are tensioned so as to urge platform 18 outwardly of its folded position relative to the swing frame 14. In addition, the tension in spring 138 acting upon the lower end of throw-out arm or lever 126 serves to eject or initiate movement of the swing frame 14 outwardly of its retracted position. The spring 138 urges roller 128 in a counterclockwise direction as seen in FIG. 7, whereby an outwardly directed force is applied at pivot 127 to the leg 34 of swing frame 14. The force serves to cause outward pivotal movement of the frame, while at the same time the platform 18 is moved outwardly of its folded relation within the swing frame 14.

OPERATION

When the platform 18 is to be lowered, switch 51 is moved to its "down" position and solenoid valve 53 is released whereby the valve is shifted as by a solenoid spring to enable hydraulic fluid to drain from the upper end of the cylinder or ram 20. The spring of plunger 118 and the throw-out arm 126 pivot the swing frame 14 and platform 18 outwardly of the van, bridge plate 15 is also caused to unfold. The platform 18 pivots outwardly with roller 94 riding upon cam surface 96 until the platform swings beyond its true vertical or top dead center position. Thereafter, the force of gravity will cause continued downward pivotal movement of the platform 18, its descent being controlled at a uniform and moderate rate by upward movement of the piston rod 52 whereby cables 56 and 58 are slowly reeled out. The platform 18 exerts a force on cables 56 and 58 which is related to the weight of the platform and the lever arm distance *a* (FIG. 4) measured from the pivotal axis 43 of the platform to the pulleys 74 and 76 carried on the side rails of the platform. The cables 56 and 58 are thus reeled out around the pulleys 74 and 76 carried on the legs of the slide frame 16 and thus exert upwardly acting forces on these pulleys whereby the frame is held in its telescoped position within the tubular legs of the swing frame 14. The platform is thereby lowered by a rate of movement which is governed by the gradual release of hydraulic fluid by the solenoid valve 53 from the upper end of the cylinder 20. When the platform reaches its horizontal position, lower edge portions of its side rails 40 and 42 abut the transverse bar 35 which spans the lower end of the slide frame and further pivotal movement of the platform is thus prevented. At the same time, the switch 51 will generally be released by the operator as the wheelchair to be off-loaded is rolled from the van onto the platform 18.

After the wheelchair is positioned on the platform, the switch 51 is further actuated to its "down" position. Hydraulic fluid released from the upper end of the cylinder 20 is returned by hose 55 to reservoir 59. As the piston rod 52 and the pulley 54 carried thereby continues to move upwardly, the cables 56 and 58 are reeled out at a uniform and controlled rate, which is double that of the rate of movement of the piston rod 52. The slide frame 16 and the horicontally oriented platform supported thereby are lowered as a unit until the platform comes to rest on the ground. As this occurs, tension on the coil springs 82 (FIG. 4) is released and the safety ramp or gate 50 drops by gravity to its down position to enable the wheelchair to be easily rolled off the platform.

In raising a wheelchair from the ground to the van, the reverse procedure is used. Once the wheelchair has been rolled onto the platform, the operator may operate the control switch 51 to the "up" position and hydraulic fluid under pressure will be supplied to the upper high pressure end of the cylinder or ram 20. Pulley 54 is thus moved downwardly and the outer ends of cables 56 and 58 are taken up. The first action resulting from the takeup of the cables is the tensioning of springs 82 whereby cables 56 and 58 pivot the ramp 50 to its closed position (FIG. 4). Continued takeup of the cables causes the slide frame to move upwardly. The weight of an occupied wheelchair exerts a downward force on the platform sufficient to prevent the pivotal movement of the platform 18. As a result, cables 56 and 58 raise the slide frame upwardly while the platform is maintained in its horizontal position. The slide frame and platform continue to move upwardly until stop 85 on the slide legs 36 abuts the lower edge of the tubular leg of the swing frame. In its stop position, the platform is generally at the same level as the van floor and the bridge plate 15. The weight of an occupied wheelchair will prevent any pivotal movement of the platform 18 until the weight is removed even if the actuator switch 51 is accidentally moved to its "up" position. Once the wheelchair is rolled into the van, the operator may operate the switch 51 to cause the hydraulic ram to pivot the platform upwardly and into generally coplanar or folded relationship with the swing frame. As this action is taking place, roller 94 on the swing frame engages the arcuate cam 96 and the trip plate 112 causes folding of the bridge plate 15 whereby the lift swings to its FIG. 6 position within the van. A suitable latch mechanism (not shown) may be provided whereby the lift is positively locked in its folded and secured position within the van.

It will thus be noted that one hydraulic cylinder, together with one continuous cable on each side of the lift, provides the means for raising, lowering, folding and unfolding the several component parts of the lift. Moreover, the power stroke of the single acting ram is used for raising and folding the lift, while the lift is lowered by the exhaust or return stroke of the ram and impetus is provided for unfolding the lift the storage of potential mechanical energy derived from the kinetic energy of the power stroke.

Having thus described this invention, what is claimed is:

1. Wheelchair lift for installation in van-type vehicles comprising a swing frame pivotable adjacent its upper end for movement from a position within the body of the van to a position extending outwardly of the van, a slide frame carried by said swing frame and movable upwardly and downwardly relative to the lower end of said swing frame, a wheelchair supporting platform carried adjacent the lower end of said slide frame and pivotable to and from a horizontal position and a folded upright position generally coplanar within the swing frame, drive means for raising and lowering said slide frame relative to the swing frame and for pivoting said platform to and from its horizontal position, said drive means including an hydraulic ram, a flexible drive operable in response to said ram connected with said platform for pivoting the same between its horizontal and upright positions and with said slide frame for moving the same upwardly and downwardly relative to the lower end of said swing frame, said lift including means for guiding said flexible drive means from said hydraulic ram to points of engagement with the swing frame and the pivotable platform.

2. Wheelchair lift as set forth in claim 1 in which the outer end of said platform includes a pivotable ramp, the said flexible drive means being connected with said ramp for moving the same in response to said operation of said hydraulic ram.

3. Wheelchair lift as set forth in claim 1 in which said lift includes a fixed frame disposed within the doorway of said van, said swing frame being pivotably supported by said fixed frame, means for storing potential energy when said platform is folded toward said swing frame and when said swing frame is pivoted toward said fixed frame to its retracted position within said van, when the lift is being lowered, said energy storing means serving to thrust said swing frame away from its retracted position and to move said platform from its folded position relative to said swing frame.

4. Wheelchair lift as set forth in claim 2 in which said ram includes a piston rod with a pulley carried thereon and in which said flexible drive means includes one continuous cable disposed on each side of said lift, the cables being engaged with the pulley carried by said piston rod and each of said cables extending alongside said slide frame and platform and terminating at the connections to said ramp, the guide means for said cables comprising pulleys disposed on each side of said slide frame and platform.

5. Wheelchair lift as set forth in claim 4 in which said slide frame is provided with a first pair of pulleys each adjacent the lower end and opposite sides of said slide frame, a second pair of pulleys, each spaced above one of said first pair of pulleys, a third pair of pulleys, each disposed on one side of said platform at a predetermined distance from the pivot point of said platform, each cable extending under each of the first pair of pulleys and then up and over each of the second pair and then downwardly and under the third pair, said predetermined distance providing a lever arm of such length as to cause pivotal movement of said platform by the force applied by said cables on said third pair of pulleys in response to movement of said ram when the platform is unoccupied and to prevent such pivotal movement when a substantial weight exerts a downward force on the platform.

6. Wheelchair lift as set forth in claim 4 in which said cables are connected adjacent the upper end of said lift and loop downwardly around the pulley carried by said piston rod and then upwardly to points adjacent the upper opposite ends of said swing frame, each cable extending from said points continuously alongside said swing frame, slide frame and platform and having its terminal end connected to said ramp, the effective length of each said cable from said points adjacent the upper opposite of said swing frame to said ramp being variable in response to the power and return stroke of said ram.

7. Wheelchair lift as set forth in claim 6 in which valve means controls the supply of pressurized hydraulic fluid to one end of said ram for the power stroke thereof and also controls the release of hydraulic fluid from said one end of the ram for the return stroke thereof, the power stroke of said ram resulting in movement of the ram pulley which decreases the effective length of said cables causing sequential upward movement of said ramp, slide frame, and platform, the return stroke of said ram resulting in increase of the effective length of said cables whereby gravity causes sequential downward pivotal movement of said platform and lowering of said slide frame and ramp.

8. Wheelchair lift as set forth in claim 7 in which said swing frame includes a pair of legs and said hydraulic ram is carried on and generally parallel to one leg of said swing frame, a fixed frame is disposed within the doorway of said van and said swing frame is pivotably supported by said fixed frame, spring means supported by said fixed frame which are tensioned when the lift is folded during the power stroke of said ram, the tension stored by said spring means serving to thrust the swing frame outwardly of its retracted position and to move said ram beyond its vertical position so that the force of gravity causes continued unfolding and lowering of said platform and slide frame under restraint by the exhaust stroke of said ram.

9. Wheelchair lift as set forth in claim 8 in which an arcuate cam is disposed on said fixed frame and a coacting cam follower is carried by said platform for engagement with said cam during a portion of the angular movement of said platform relative to said swing frame and a foldable bridge plate adapted to span from said platform to the floor of said van, and means to actuate the folding and unfolding of said bridge plate in response to pivotable movement of said platform relative said swing frame.

10. Wheelchair lift for van-type vehicles comprising a fixed frame mounted within the doorway opening of a van-type vehicle, a pivotable swing frame supported by said fixed frame and including downwardly extending tubular legs, a generally U-shaped slide frame having upwardly extending slide members telescopically movable within the tubular legs of the swing frame, a wheelchair support platform pivotably carried at the lower end of said slide frame and a pivotable safety ramp carried on the outer end of said platform, an hydraulic ram including a movable piston rod, said ram being carried alongside one of the tubular legs of said swing frame, a cable which extends on each side of the lift continuously from said ramp to said piston rod of said ram, said piston rod having a power stroke in one direction and an exhaust stroke in the opposite direction, the power stroke of said ram causing the cables to sequentially pivot said ramp upwardly, move said slide frame upwardly within the tubular legs of the swing frame and pivot said platform upwardly and spring means to provide slack in the outer end portion of each said cable to permit said ramp to pivot to its down position when said platform comes to rest on the ground.

* * * * *